J. F. BOYNTON.
Carbureter.
No. 70,512.  Patented Nov. 5, 1867.
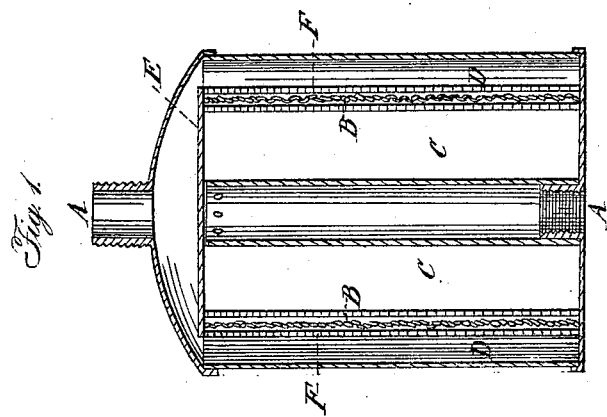
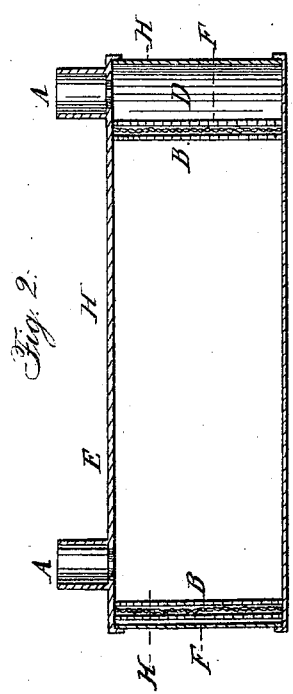
Witnesses:
Jos. L. Coombs.
Edw. S. Brown.
Inventor:
John F. Boynton.

United States Patent Office.

JOHN F. BOYNTON, OF SYRACUSE, NEW YORK.

Letters Patent No. 70,512, dated November 5, 1867.

IMPROVEMENT IN CARBURETTING GASES AND AIR.

The Schedule referred to in these Letters Patent and making part of the same.

TO ALL WHOM IT MAY CONCERN:

Be it known that I, JOHN F. BOYNTON, of the city of Syracuse, Onondaga county, and State of New York, have invented a new and improved Apparatus for Carbonizing and Increasing the Quantity of Light from Ordinary Street Gas and Air; also carbonizing other gases, such as hydrogen, carbonic, oxide, and carbonic acid, or any other gases susceptible of carbonization.

It is well known that gas made from inferior coal is not rich in illuminating qualities, but by passing it through the vapors of hydrocarbons, it becomes enriched by absorbing light-producing elements; and when gas has been deprived of its illuminating quality by standing a long time in the gas-holders over water, or is conveyed great distances through pipes at a low temperature, it precipitates much of its luminous properties, which can be restored by the arrangement herein described; and having never heard of an apparatus arranged in this manner, I named it the "Gas-Light Multiplier;" and to enable others skilled in the art to make and use my invention, I will proceed to describe its construction and operation, and I do declare that the following is a full and exact description thereof, reference being had to the accompanying drawings, and to the letters of reference marked thereon.

Figure 1 is a horizontal view of a vertical section.

Figure 2 a horizontal section, seen from above, of a vessel for carburetting gas.

Fig. 1 is a sectional view of a small cylindrical gas-light multiplier, so constructed that it may be secured to an upright nipple of a gas-burner. In this figure is seen a double-walled perforated partition, dividing the vessel into an inner and outer chamber, having a plate across the top of the outer wall, forming a separation between the external and internal chambers, so that all the gas which enters the inner chamber, on its way to the burner, is forced through the perforated walls, and the capillary substances arranged between them. These walls may be made of perforated plates, of sheet metal or wire gauze, extending from the bottom of the vessel to the top, having a space between them which is filled with fibrous material or any other substance capable of producing capillary action, for carrying the fluid or fluids between the perforated walls to the upper portion of the vessel.

Fig. 2 is an arrangement in an ellipsoidal form, involving the same principle as shown in fig. 1; the double perforated walls dividing the vessel into two compartments, an outer and an inner chamber, and designed to be applied at any point on the gas pipes. The form of the double walls is elliptical or flattened, and having capillary material between them, is so arranged that gas, in passing through the vessel, is brought in contact with the external and internal surfaces of the perforated partition, and made to pass through the fibrous material between them, thus causing a rapid mode of carbonization. This view shows the perforated walls nearer one end of the vessel than the other, thereby presenting a convenience for arranging the entrance and exit pipes into and from the different chambers.

A A entrance and exit tubes. B the double perforated walls, with fibrous material between them, seen in fig. 1 equally distant from the walls of the vessel.

In fig. 2, B the double perforated walls, with fibrous material between them, are placed nearer to one end of the vessel than the other, and so arranged for the convenience of the entrance and exit pipes A A to the internal chamber C and external chamber D. E is a capillary material between perforated walls.

The letters in different figures refer to similar parts. Arrows show the direction of moving gas. The red lines indicate the hydrocarbons in the multiplier.

Having thus described my invention, what I claim as new, and desire to secure by Letters Patent of the United States, is—

1. In an apparatus for carburetting gases for illuminating purposes, I claim the use of double perforated walls B B, having a suitable capillary substance confined between them, said walls being so arranged as to form a porous division through which the gas is forced, substantially as described.

2. The forming of two compartments in a vessel, by means of an upright double-walled partition, which is rendered sufficiently porous to allow of the absorption of the fluid in said vessel, and the passage of gas through it, substantially as described.

JOHN F. BOYNTON.

Witnesses:
   Jos. L. COOMBS,
   EDM. F. BROWN.